March 4, 1958     A. D. FLOIED     2,825,176
ANIMAL TRAP
Filed Aug. 24, 1955     2 Sheets-Sheet 1
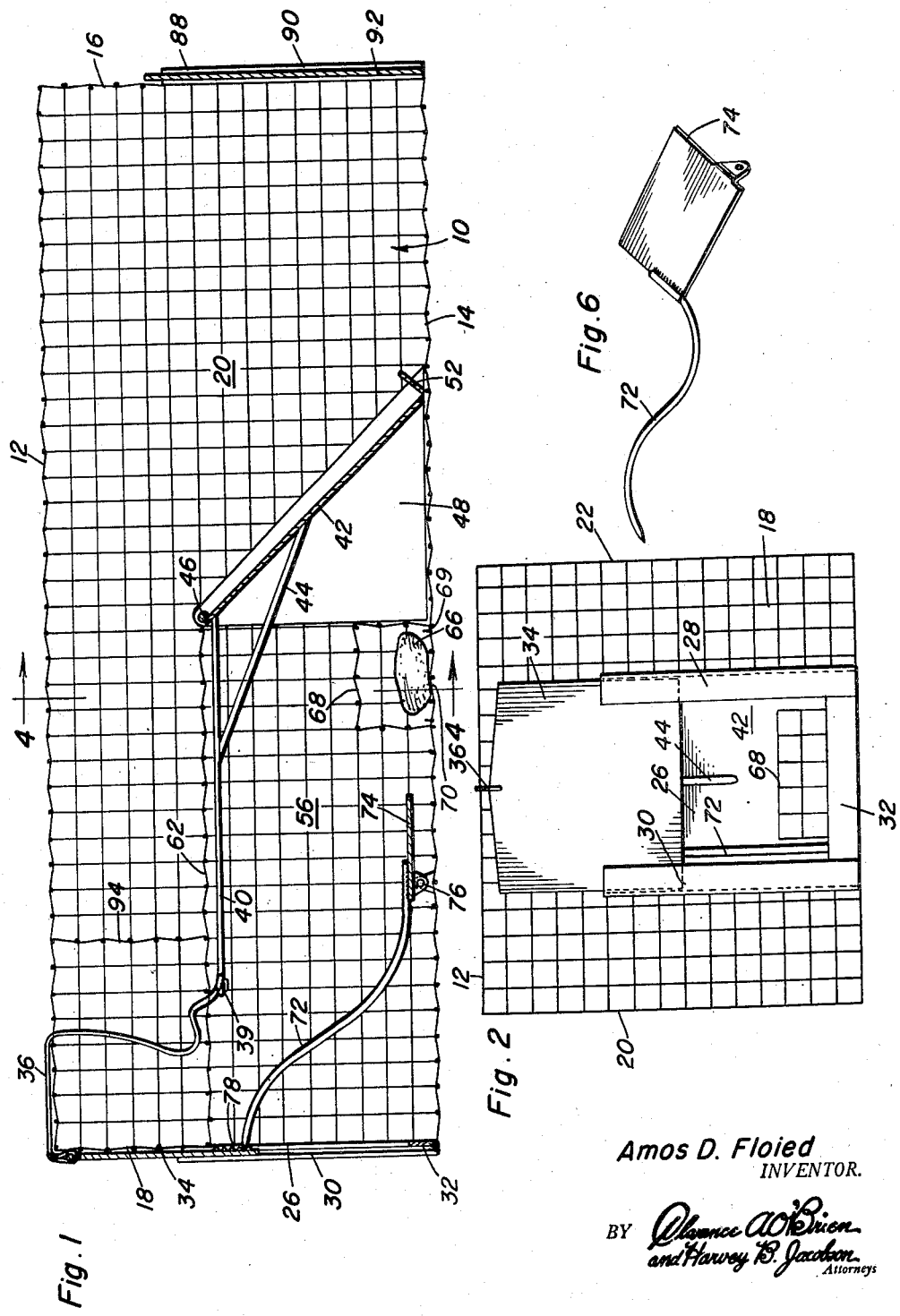
Amos D. Floied
INVENTOR.

March 4, 1958 A. D. FLOIED 2,825,176
ANIMAL TRAP
Filed Aug. 24, 1955 2 Sheets-Sheet 2

Amos D. Floied
INVENTOR.

BY *Clarence A. O'Brien*
and *Harvey B. Jackson*
Attorneys

United States Patent Office 2,825,176
Patented Mar. 4, 1958.

2,825,176

ANIMAL TRAP

Amos D. Floied, Centerville, Tenn.

Application August 24, 1955, Serial No. 530,352

3 Claims. (Cl. 43—61)

This invention relates generally to animal traps, and particularly to traps for rodents which are automatically reset by the actions of the rodent.

An object of this invention is to provide a trap which has a chamber into which the rodent is induced, as by placing bait therein, there being means to trip a door closed after the rodent enters the chamber and means in the chamber operable in response to a nudge by the rodent for elevating the door in order to be ready to be actuated by a different rodent.

Although this trap is primarily useful for catching rodents, it is apparent that other small animals may be trapped by it. Accordingly, although the invention is described as being useful with rodents, it is understood that the same may be employed for trapping other animals.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal sectional view of a trap embodying the principles of the invention;

Figure 2 is an end view of the trap in Figure 1;

Figure 6 is a perspective view of the door latch and release device operated by the captured animal.

Figure 3:
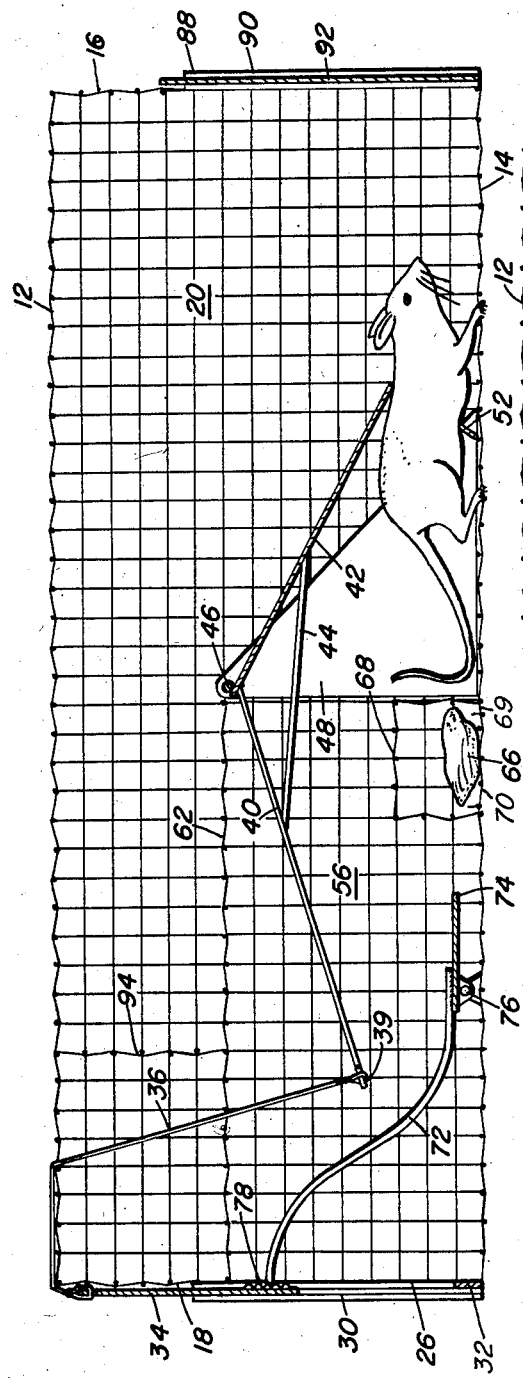
Figure 3 is a longitudinal sectional view similar to the view of Figure 1 but showing various parts in different positions.

In the accompanying drawings, there is a chamber 10 formed by top and bottom walls 12 and 14, end walls 16 and 18 and side walls 20 and 22. All of the walls are made of a mesh material, as a reasonably heavy gauge screen.

An animal entrance 26 is formed in the end wall 18. It has a pair of tracks 28 and 30 respectively secured along opposite vertical edges and a lower cross-member 32 secured thereto. These tracks open inwardly and upwardly in order to accommodate a vertically sliding door 34 which has a string or fine flexible cable 36 secured to it. This string or cable 36 is connected in an aperture in the upper central part of the door 34 and extends over a portion of the top 12, dropping through one of the holes therein and being secured to an eye 39 on the end of lever 40. Lever 40 is secured to a door 42, and a brace 44 strengthens the connection. This door is secured to a pivot pin 46 whose ends are disposed in openings provided in vertical plates 48 and 50. These plates are soldered or otherwise secured to the bottom 14, and a sill 52 extends across the plates 48 and 50 near the bottom of the door 42. This sill serves as a protector to prevent the trapped animal from returning through the doorway and also strengthens the plates 48 and 50 in that it holds them fixed together as a unit.

Figure 4:
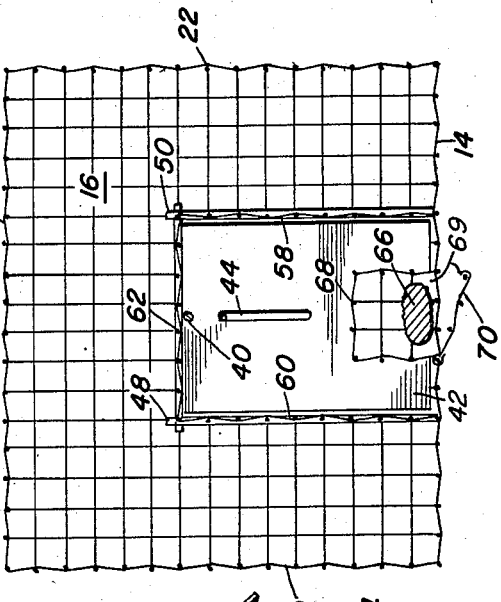
Figure 4 is a transverse sectional view taken substantially on the line 4—4 of Figure 1 and in the direction of the arrows.
Figure 5:
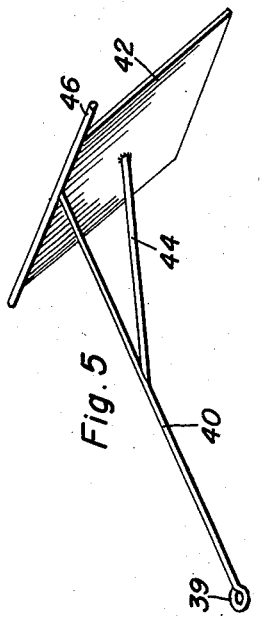
Figure 5 is a perspective view of a door used in the trap for resetting the same in response to motion imparted thereto by the captured rodent.

The door 42 is a closure for a compartment 56 which is in the chamber 20, the compartment being formed by vertical walls 58 and 60 which extend from end wall 18, a top wall 62 which extends horizontally from the wall 18 (Figure 4), and a part of the bottom 14. The vertical plates 48 and 50 form continuations of the walls 58 and 60. In capturing a rodent, it enters the compartment 56 initially, through entrance 26. Rodent bait 66 is disposed in the compartment 56 and protected by a mesh box 68 the bottom of which has an opening 69 over which there is a hinged door 70 (Figure 4) which latches and unlatches in order to renew the bait 66.

Means for holding the door 34 in such position as to allow the animal to enter compartment 56 are provided in the compartment 56. The preferred means consists of a latch rod 72 having one end secured to a trigger plate 74 that is mounted on pivot 76 on the bottom 14 of compartment 56. The outer end of the latch rod 72 is preferably pointed so as to fit in the serrations or other types of depressions 78 on the inner surface of door 34. Moreover, the weight of the latch rod 72 is in excess of the weight of the trigger plate 74 and all other structure on that side of the pivot 76. Therefore, the latch rod 72 will tend to bear against the inner surface of door 34 at all times.

A pair of vertical tracks 88 are provided on opposite sides of an opening 90 in the end wall 16. This opening is used for withdrawing the captured rodents. Accordingly, a vertically sliding door 92 is located in these tracks 88 and is manually operable by the person tending the trap.

In use, the trap is set initially as shown in Figure 1. The animal is induced to enter the compartment 56 by the bait 66. As it passes into the compartment 56 and pushes the latch rod 72 or steps on the trigger plate 74, the outer end of the rod 72 is separated from the serrations, teeth or the like indicated at 78. The weight of the door 34 sends it down to a position closing the entrance 26. Then, as the animal explores, it ultimately nudges the door 42 and passes therethrough. As the door 42 is swung on its pivot 46, rod 40 rotates, thereby pulling the flexible string 36 which elevates door 34. Inasmuch as the rod 72 bears against the inner surface of the door, it becomes engaged with the serrations 78 and holds the door in the elevated position, thereby resetting the trap for another animal to be trapped.

After the animal passes the door 42 (Figure 3), it is trapped in the chamber 20. He may be withdrawn through the door 90 at the will of the person tending the trap. In order to prevent the animal from destroying the string 36, a vertical shield 94, preferably in the form of a wire mesh, is secured to the top 62 and the top 12 of the compartment 56 and chamber 20, respectively.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An animal trap comprising a plurality of wire mesh walls defining an animal chamber, a separate compartment in said chamber and having an entrance, a mesh bait box in said separate compartment, a door, rails located on opposite sides of said entrance and mounting said door for sliding movement to control said entrance of said compartment, a latch normally holding said door open, a trigger adapted to be actuated by an animal in said compartment for releasing said latch from engagement with said door to allow said door to close, a second door in said compartment separating said compartment from said chamber, and means operatively connected to said second door for resetting said first mentioned door in response to opening movement thereof.

2. The combination of claim 1 and one of said walls having an opening therein in order to insert bait into said compartment, a closure hinged to said one of said walls and covering said opening, and said bait box being registered with the last-mentioned opening.

3. The animal trap of claim 1 wherein said means for resetting said first mentioned door includes a lever secured to said door which separates said compartment from said chamber, and means connecting said lever to said first mentioned door for transmitting a force to said first mentioned door which elevates said first mentioned door when said door which separates said chamber is actuated in one direction.

References Cited in the file of this patent

UNITED STATES PATENTS

| | | |
|---|---|---|
| 988,863 | Crabtree | Apr. 4, 1911 |
| 1,866,228 | Smith | July 5, 1932 |